United States Patent
Jones

(10) Patent No.: US 10,985,859 B2
(45) Date of Patent: Apr. 20, 2021

(54) OPTICAL PROTECTION SWITCH WITH BROADCAST MULTI-DIRECTIONAL CAPABILITY

(71) Applicant: Juniper Networks, Inc., Sunnyvale, CA (US)

(72) Inventor: Kevan Peter Jones, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/683,585

(22) Filed: Nov. 14, 2019

(65) Prior Publication Data

US 2020/0083976 A1    Mar. 12, 2020

Related U.S. Application Data

(62) Division of application No. 15/721,804, filed on Sep. 30, 2017, now Pat. No. 10,511,401.

(51) Int. Cl.
*H04J 14/02* (2006.01)
*H04B 10/27* (2013.01)
(Continued)

(52) U.S. Cl.
CPC ...... *H04J 14/0212* (2013.01); *G02B 6/29395* (2013.01); *G02B 6/35* (2013.01);
(Continued)

(58) Field of Classification Search
CPC .. H04J 14/0212; H04J 14/0202; H04J 14/021; H04J 14/0227; H04J 14/0293;
(Continued)

(56) References Cited

U.S. PATENT DOCUMENTS 6,366,716 B1    4/2002   Graves
2005/0220395 A1*  10/2005  Shiozaki ............... G02B 6/266
                                                  385/18

(Continued)

FOREIGN PATENT DOCUMENTS

WO    WO 2002/023244    3/2002

OTHER PUBLICATIONS

Partial European Search Report and Provisional Opinion for European Application No. 18191766.7, dated Feb. 21, 2019, 14 pages.

(Continued)

*Primary Examiner* — Leslie C Pascal
(74) *Attorney, Agent, or Firm* — Cooley LLP

(57) ABSTRACT

An apparatus includes a first reconfigurable optical add/drop multiplexer (ROADM) to receive a first optical signal and a second ROADM to receive a second optical signal. The apparatus also includes a reconfigurable optical switch that includes a first switch, switchable between a first state and a second state, to transmit the first optical signal at the first state and block the first optical signal at the second state. The reconfigurable optical switch also includes a second switch, switchable between the first state and the second state, to transmit the second optical signal at the first state and block the second optical signal at the second state. The reconfigurable optical switch also includes an output port to transmit an output signal that is a sum of possible optical signals transmitted through the first switch and the second switch.

15 Claims, 12 Drawing Sheets

(51) Int. Cl.
*G02B 6/35* (2006.01)
*H04Q 11/00* (2006.01)
*G02B 6/293* (2006.01)

(52) U.S. Cl.
CPC ............ *H04B 10/27* (2013.01); *H04J 14/021* (2013.01); *H04J 14/0202* (2013.01); *H04J 14/0227* (2013.01); *H04J 14/0289* (2013.01); *H04J 14/0293* (2013.01); *H04Q 11/0005* (2013.01); *H04Q 11/0062* (2013.01); *H04Q 2011/0035* (2013.01); *H04Q 2011/0039* (2013.01); *H04Q 2011/0043* (2013.01); *H04Q 2011/0047* (2013.01); *H04Q 2011/0081* (2013.01)

(58) Field of Classification Search
CPC ................ H04J 14/0289; H04B 10/27; H04Q 2011/0081; H04Q 2011/0043; H04Q 2011/0039; H04Q 2011/0047; H04Q 2011/0035; H04Q 11/0062; H04Q 11/0005; G02B 6/29395; G02B 6/3552; G02B 6/354; G02B 6/3548; G02B 6/35
See application file for complete search history.

(56) References Cited

U.S. PATENT DOCUMENTS

| | | |
|---|---|---|
| 2008/0260386 A1 | 10/2008 | Boduch et al. |
| 2009/0103915 A1* | 4/2009 | Aprile ................. H04J 14/029 398/2 |
| 2009/0180779 A1 | 7/2009 | Boduch et al. |
| 2009/0226168 A1 | 9/2009 | Boduch et al. |
| 2010/0284696 A1* | 11/2010 | Gao ..................... H04J 14/021 398/85 |
| 2012/0230690 A1* | 9/2012 | Doerr ................ G02B 6/12033 398/49 |
| 2015/0055952 A1 | 2/2015 | Younce et al. |
| 2015/0125141 A1* | 5/2015 | Hu .................... H04B 10/0793 398/5 |
| 2015/0208146 A1 | 7/2015 | Younce et al. |

OTHER PUBLICATIONS

Extended European Search Report for European Application No. 18191766.7, dated Jun. 28, 2019, 15 pages.

* cited by examiner

OPTICAL PROTECTION SWITCH WITH BROADCAST MULTI-DIRECTIONAL CAPABILITY

CROSS-REFERENCE TO RELATED APPLICATIONS

This application is a Division of U.S. patent application Ser. No. 15/721,804, now U.S. Pat. No. 10,511,401, filed Sep. 30, 2017, and entitled "Optical Protection Switch With Broadcast Multi-Directional Capability," the disclosure of which is incorporated herein by reference in its entirety.

FIELD

One or more embodiments relate to methods and apparatus of optical protection switching with broadcast capability.

BACKGROUND

Telecommunication networks usually use one or more end-to-end protection schemes to protect against potential failures on service providers' network(s) that might affect the services offered to end customers. In an optical telecommunication network, one protection scheme is the 1+1 protection scheme, in which a head-end optical splitter is used to split an optical signal and send duplicated copies of the optical signal into two paths (usually referred to as primary path and secondary path) for diverse path routing. The conventional 1+1 protection scheme also employs a tail-end optical switch (e.g., a 2×1 optical switch) connected to the two paths to select the copy of the optical signal from either the primary path or the secondary path. For example, if the optical network detects that the signal from the primary path is unsatisfactory (e.g., the signal power is lower than a threshold value), the secondary path is then used for communication. In this scheme, the tail-end optical switch, also referred to as the optical protection switch, can only select one path or the other, but not both.

In optical networks using reconfigurable optical add/drop multiplexers (ROADMs), additional degrees of freedom are introduced as the optical multiplexing may also be multi-stage. For example, a group of channels can be multiplexed into one single fiber employed as the primary path and another single fiber employed as the secondary path. In this case, optical protection can be applied to the whole group of optical channels by inserting the optical protection switch between the primary and secondary multiplexers. The optical protection switch, however, usually can only switch the entire group and lacks the flexibility for multi-direction multiplexing. In other words, existing approaches usually can only receive the group of protected channels from one direction or the other. Some other multi-direction multiplexer approaches, in contrast, may allow for channels to be configured as non-protected services, but still share a single common mux/demux port.

SUMMARY

Some embodiments described herein relate generally to optical protection switching with broadcast capability, and, in particular, to methods and apparatus for optical protection switching by replacing 2×1 optical switches in an optical network with 2 or more 1×1 optical switches.

In some embodiments, an apparatus includes a first reconfigurable optical add/drop multiplexer (ROADM) configured to receive a first optical signal on a first optical channel and a second ROADM configured to receive a second optical signal on a second optical channel. The apparatus also includes a reconfigurable optical switch that includes a first switch, in optical communication with the first ROADM and switchable between a first state and a second state, to transmit the first optical signal at the first state and block the first optical signal at the second state. The reconfigurable optical switch also includes a second switch, in optical communication with the second ROADM and switchable between the first state and the second state, to transmit the second optical signal at the first state and block the second optical signal at the second state. The reconfigurable optical switch also includes an output port, in optical communication with the first switch and the second switch, to transmit an output signal that is a sum of possible optical signals transmitted through the first switch and the second switch.

In some embodiments, a method includes receiving a first optical signal from a first reconfigurable optical add/drop multiplexer (ROADM) and transmitting the first optical signal to a first switch in optical communication with the first ROADM. The first optical switch is switchable between a first state and a second state. The first switch is configured to transmit the first optical signal at the first state and block the first optical signal at the second state. The method also includes receiving a second optical signal from a second ROADM and transmitting the second optical signal to a second switch in optical communication with the second ROADM. The second switch is switchable between the first state and the second state. The second switch is configured to transmit the second optical signal at the first state and block and second optical signal at the second state. The method also includes generating an output signal that is a sum of possible optical signals transmitted through the first switch and the second switch.

In some embodiments, an optical network includes a first node, a second node, and a third node. The first node includes a first transceiver to transmit a first optical signal, a first reconfigurable optical add/drop multiplexer (ROADM) operatively coupled to the first transceiver, and a first switch disposed between the first ROADM and the first transceiver. The first node also includes a second ROADM operatively coupled to the first transceiver and a second switch disposed between the second ROADM and the first transceiver. The second node includes a second transceiver to transmit a second optical signal, a third ROADM operatively coupled to the second transceiver and configured to receive the first optical signal from the first node, and a third switch disposed between the third ROADM and the second transceiver. The second node also includes a fourth ROADM operatively coupled to the second transceiver and a fourth switch disposed between the fourth ROADM and the second transceiver. The third node includes a third transceiver to transmit a third optical signal, a fifth ROADM operatively coupled to the third transceiver and configured to receive the first optical signal from the first node, and a fifth switch disposed between the fifth ROADM and the third transceiver. The third node also includes a sixth ROADM operatively coupled to the third transceiver and configured to receive the second optical signal from the second node and a sixth switch disposed between the sixth ROADM and the third transceiver. The optical network also includes a controller, operatively coupled to the first node, the second node, and the third node, to control the first switch, the second switch, the third switch, the fourth switch, the fifth switch, and the sixth switch.

BRIEF DESCRIPTION OF THE DRAWINGS

The drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
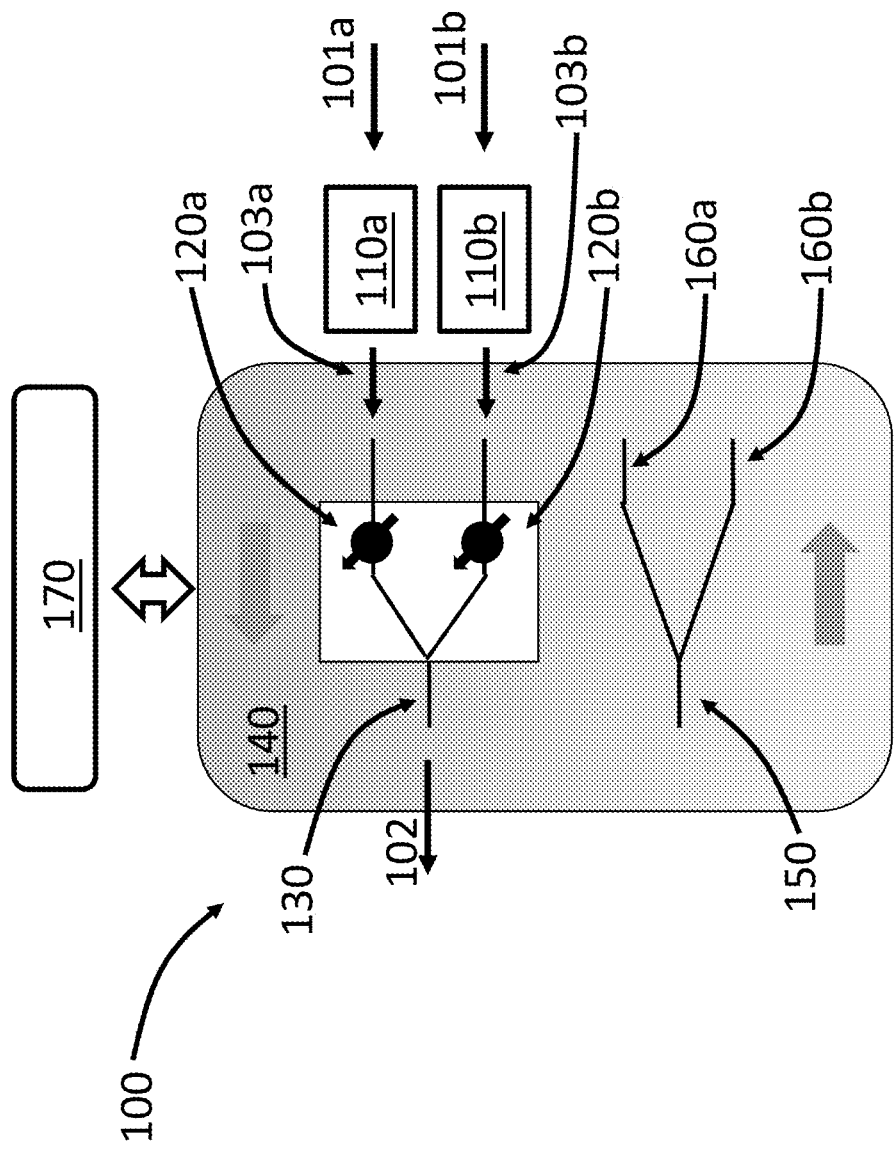
FIG. 1 shows a schematic of an apparatus reconfigurable between an optical protection switch and a broadcast switch, according to some embodiments.

In some embodiments, an apparatus includes a first reconfigurable optical add/drop multiplexer (ROADM) configured to receive a first optical signal on a first optical channel and a second ROADM configured to receive a second optical signal on a second optical channel. The apparatus also includes a reconfigurable optical switch that includes a first switch, in optical communication with the first ROADM and switchable between a first state and a second state, to transmit the first optical signal at the first state and block the first optical signal at the second state. The reconfigurable optical switch also includes a second switch, in optical communication with the second ROADM and switchable between the first state and the second state, to transmit the second optical signal at the first state and block the second optical signal at the second state. The reconfigurable optical switch also includes an output port, in optical communication with the first switch and the second switch, to transmit an output signal that is a sum of possible optical signals transmitted through the first switch and the second switch.

In some embodiments, the first switch and/or the second switch can include at least one of a variable optical attenuator (VOA), an electro-optical switch, an acousto-optical switch, and an opto-mechanical switch.

In some embodiments, the first ROADM is configured to transmit a first spectral component at a first wavelength and block spectral components at other wavelengths. The second ROADM is configured to transmit a second spectral component at a second wavelength and block spectral components at other wavelengths. The output signal includes the first spectral component and the second spectral component.

In some embodiments, the first ROADM is configured to transmit a first group of spectral components at a first group of wavelengths (each spectral component can have a distinct wavelength), the second ROADM is configured to transmit a second group of spectral components at a second group of wavelengths (each spectral component can have a distinct wavelength), and the output signal includes the first group of spectral components and the second group of spectral components.

In some embodiments, the apparatus further includes a demultiplexer, in optical communication with the output port, to direct the first spectral component to a first receiver and the second spectral component into a second receiver. In some embodiments, the apparatus further includes an optical splitter to distribute different spectral components to different receivers. The apparatus can also use the selectivity of coherent detectors (e.g., using a local oscillator) to detect signal from each individual spectral component at a distinct wavelength.

In some embodiments, the apparatus also includes a controller, operatively coupled to the first switch and the second switch, to control the apparatus between at least three operation modes: a first operation mode, a second operation mode, and a third operation mode. In the first operation mode, the first switch is in the first state and the second switch is in the second state, in which case the apparatus is used as an optical protection switch. In the second operation mode, both the first switch and the second switch are configured in the first state, in which case the apparatus is used for multi-direction broadcast allowing unprotected wavelength operation to have high spectral efficiency usage (see more details below with reference to FIGS. 10A and 10B). In the third operation mode, both the first switch and the second switch are configured in the second state.

In some embodiments, the apparatus can include more than two ROADMs and accordingly more than two switches. For example, the number of ROADMs can be $2^N$, where N is a positive integer. In this case, the output signal is a sum of possible optical signals transmitted through these multiple switches.

In some embodiments, a method includes receiving a first optical signal from a first reconfigurable optical add/drop multiplexer (ROADM) and transmitting the first optical signal to a first switch in optical communication with the first ROADM. The first optical switch is switchable between a first state and a second state. The first switch is configured to transmit the first optical signal at the first state and block the first optical signal at the second state. The method also includes receiving a second optical signal from a second ROADM and transmitting the second optical signal to a second switch in optical communication with the second ROADM. The second switch is switchable between the first state and the second state. The second switch is configured to transmit the second optical signal at the first state and block the second optical signal at the second state. The method also includes generating an output signal that is a sum of possible optical signals transmitted through the first switch and the second switch.

FIG. 1 shows a schematic of an apparatus 100 reconfigurable between an optical protection switch and a broadcast switch, according to some embodiments. The apparatus 100 includes a first reconfigurable optical add/drop multiplexer (ROADM) 110a to receive a first optical signal 101a and the optical signal transmitted through the first ROADM 110a is designated as 103a. A second ROADM 110b is used to receive a second optical signal 101b and the optical signal transmitted through the second ROADM 110b is designated as 103b. In some embodiments, the optical signals 101a and 103a can be identical, and the optical signals 101b and 103b can be identical.

A reconfigurable optical switch 140 is included in the apparatus 100 to receive the two optical signals 103a and 103b after the corresponding ROADM 110a and 110b. More specifically, the first optical signal 103a is transmitted to a first switch 120a and the second optical signal 103b is transmitted to a second switch 120b. Both switches 120a and 120b are switchable between a first state and the second state. In the first state (also referred to as a "pass" state), the switches 120a and 120b are configured to pass the optical signal 103a and 103b, respectively. In the second state (also referred to as a "block" state), the switches 120a and 120b are configured to block the optical signals 103a and 103b, respectively.

The two switches 120a and 120b collectively can have four different configurations. In the first configuration, the first switch 120a is in the first state to pass the first optical signal 103a and the second switch 120b is in the second state to block the second optical signal 103b. The output signal 102 then includes only the first optical signal 103a. In the second configuration, the first switch 120a is in the second state to block the first optical signal 103a and the second switch 120b is in the first state to pass the second optical signal 103b. The output signal 102 then includes only the second optical signal 103b.

In the third configuration, both switches 120a and 120b are in the first state to pass the optical signals 103a and 103b, respectively. In this configuration, the output signal 102 includes a sum of the first optical signal 103a and the second optical signal 103b. In the fourth configuration, both switches 120a and 120b are in the second state to block the optical signals 103a and 103b, respectively. In this configuration, the output signal 102 includes neither the first optical signal 103a nor the second optical signal 103b.

These different configurations of the two switches 120a and 120b allow flexible functions of the apparatus 100, which can be used as an optical protection switch and/or a multi-direction multiplexer. This provides greater flexibility in an optical network for customization of the transmission and protection of groups of channels.

For example, in some embodiments, the first signal 101a and the second signal 101b can be delivered by the same transmitter and can be substantially identical. In this case, the apparatus 100 can function as an optical protection switch. For example, the apparatus 100 can select either the first signal 101a or the second signal 101b for further use.

In some embodiments, the first optical signal 101a and the second signal 101b can be different, in which case the apparatus 100 can function as a multidirectional multiplexer. In some embodiments, the two optical signals 101a and 101b can have different wavelengths. In some embodiments, the two optical signals 101a and 101b can have different polarizations. In some embodiments, the two optical signals 101a and 101b can have different time delays (also referred to as phases).

The reconfigurable optical switch 140 also includes an output port 130, in optical communication with the first switch 120a and the second switch 120b, to receive possible signal(s) transmitted through the first switch 120a and the second switch 120b. The sum of possible signals transmitted through the two switches 120a and 120b forms an output signal 102. An optical combiner (not shown) can be used in the reconfigurable optical switch 140 to combine possible signals from the two switches 120a and 120b.

In some embodiments, the reconfigurable optical switch 140 can also have transmitting capability by including an input port 150 to receive an input signal, which is then split into two transmitting paths 160a and 160b. In these embodiments, the reconfigurable switch 140 is bi-directional.

The first ROADM 110a and the second ROADM 110b (collectively referred to as the ROAMDs 110 or ROADM degrees 110) can be based on various approaches. In some embodiments, the ROADMs 110 can include wavelength blocker (WB) type ROADMs. In some embodiments, the ROADMs 110 can be based on small switch arrays (SSAs). In some embodiments, the ROADMs 110 can use wavelength selective switches (WSSs). In some embodiments, the ROADMs 110 can be based on optical cross-connect (OXC). For ROADMs based on SSA and OXC techniques, additional wavelength selection elements can be included.

The two switches 120a and 120b (collectively referred to as switches 120) can also include various types of switches to pass/block optical signals. In some embodiments, the switches 120 include variable optical attenuators (VOAs). The VOAs can pass the optical signals 101a and 101b in the low-loss state and block the optical signals 101a and 101b in the high-loss state. In some embodiments, the attenuation ratio of the VOAs can be greater than 15 dB (e.g., greater than 15 dB, greater than 20 dB, greater than 25 dB, greater than 30 dB, greater than 35 dB, or greater than 40 dB, including any values and sub ranges in between).

In some embodiments, the switches 120 can include electro-optical switches, which usually employ one or more electro-optical crystals with variable refractive index(ices) under an electric field. In some embodiments, the electro-optical crystal can include at least one of Lithium Niobate ($LiNbO_3$), Lithium Tantalate ($LiTaO_3$), Lead Zirconate Titanate ($Pb(Zr, Ti)O_3$), and Lead Lanthanum Zirconate Titanate [$(Pb, La)(Zr, Ti)O_3$, among others. In some embodiments, the electro-optical switch can be based on Mach-Zehnder interferometers, in which an optical signal is split into two arms of the interferometers and changing the refractive index in one arm can alter the interference between the optical signals from the two arms. For example, a constructive interference can be configured as the first state to generate an output signal substantially identical to the input optical signal, while a destructive interference can be configured as the second state to generate an output signal with negligible power.

In some embodiments, the switches 120 can include acousto-optic switches, which use acoustic waves to change the transmission of the switches. In some embodiments, the switches 120 can include opto-mechanical switches, which usually redirect an optical signal by moving bulk fiber optic cable elements by mechanical devices. For example, an opto-mechanical switch can use a stepper motor to move a mirror that directs the optical signal (light) from the input to the desired output.

In some embodiments, the switches 120 are controlled manually by a user. In some embodiments, the switches 120 can be controlled by a controller 170. The controller 170 in the apparatus 100 can include any suitable processor capable of executing computer instructions. Each module in the processor can be any combination of hardware-based module (e.g., a field-programmable gate array (FPGA), an application specific integrated circuit (ASIC), a digital signal processor (DSP) and/or software-based module (e.g., a module of computer code stored in memory and/or executed at the processor) configured to execute a specific function. The processor can be a microcontroller, a FPGA, an ASIC, or any other suitable processor configured to run and/or execute the modules. The processor and modules of the processor can be configured to collectively execute the methods described herein, and/or to implement the apparatuses described herein.

Figure 2:
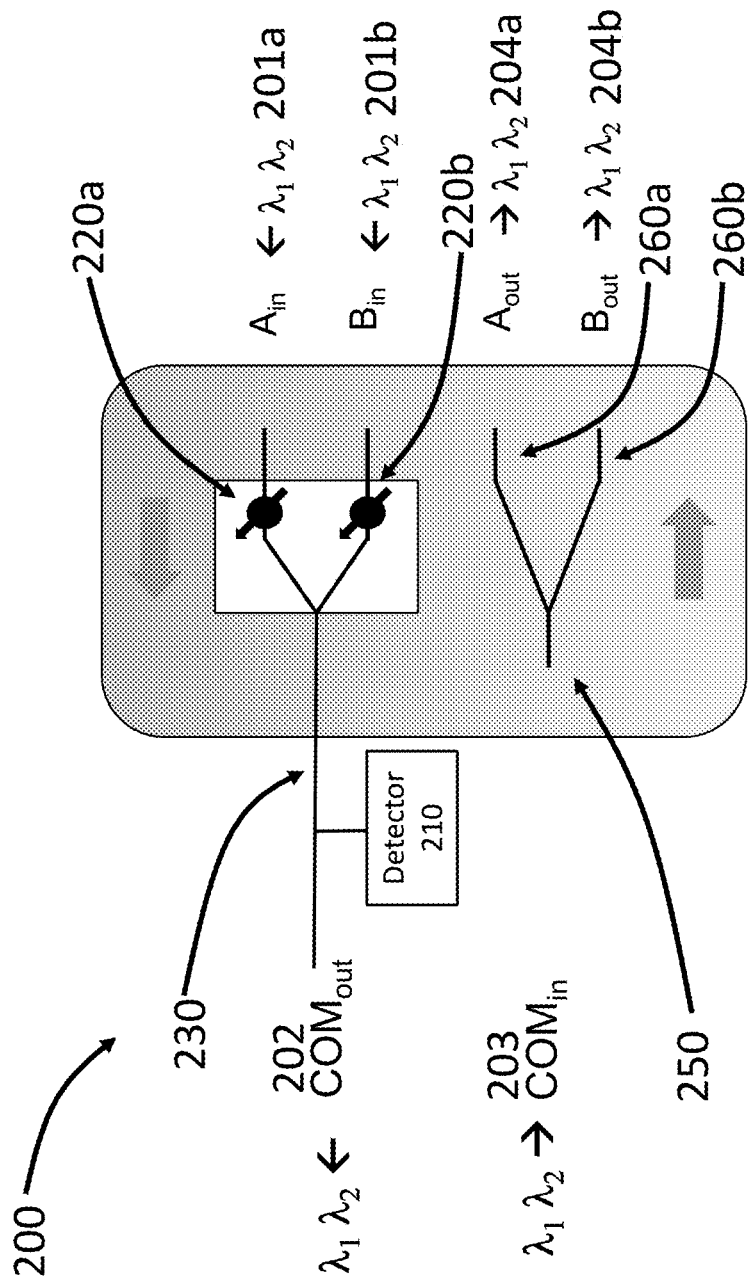
FIG. 2 shows a schematic of a reconfigurable optical switch configured in optical protection mode, according to some embodiments.

FIG. 2 shows a schematic of a reconfigurable optical switch 200 configured in optical protection mode, according to some embodiments. The reconfigurable optical switch 200 includes a first switch 220a to receive a first optical signal 201a and a second switch 220b to receive a second signal 201b. An output port 230 is in optical communication with both switches 220a and 220b to transmit an output signal 202, which is the sum of possible signals transmitted through the two switches 220a and 220b. The reconfigurable optical switch 200 also includes an input port 250 to receive an input optical signal 203 and split the input optical signal 203 into two portions 204a and 204b, each of which is directed into a corresponding path 260a and 260b.

The optical signals 201a and 201b can be substantially identical. In some embodiments, the optical signals 201a and 201b include only one spectral component having one wavelength. In some instances, the optical signals 201a and 201b include two spectral components having two distinct wavelengths (e.g., $\lambda_1$ and $\lambda_2$, as illustrated in FIG. 2). In some instances, the number of spectral components in each optical signal 201a/b can be greater than 2 (e.g., 3 spectral components, 5 spectral components, 10 spectral components, or greater, including any values and sub ranges in between).

In some embodiments, this group of spectral components (also referred to as wavelength carriers) travels together to form a single data flow (also referred to as a super-channel). In some embodiments, the group of spectral components can be multiplexed into a single fiber. In some embodiments, the group of spectral components can be multiplexed into a semiconductor waveguide or any other suitable guiding structure.

In operation, the beam path including the first switch 220a can be designated as the primary path and the switch 220a is set in the "pass" state to pass the first optical signal 201a. The beam path including the second switch 220b can be designated as the secondary path and the second switch 220b is set in the "block" state to block the second optical signal 201b. Therefore, the output signal 202 can be substantially identical to the first optical signal 201a.

In the event that a failure is detected in the primary path, the apparatus 200 can close the primary path and use the secondary path to transmit optical signals. In this case, the first switch 220a is switched to the "block" state and the second switch 220b is switched to the "pass" state. Accordingly, the output signal 202 can be substantially identical to the second optical signal 201b.

In some embodiments, the path failure can be determined based on the overall optical power measured at the output port 230. For example, a detector (not shown) can be disposed at the output port 230 to measure the amplitude, power, and/or intensity of the output signal 202. The measured signal is then transmitted to a controller (not shown) in the apparatus 200. When the measured signal is below a threshold value, the controller can determine that a failure in the primary path occurred and switch the transmission path from the primary path to the secondary path.

In some embodiments, the path failure can be determined based on the optical power of one spectral component in the output signal 202. In some embodiments, the path failure can be determined based on the optical power of a sub-group of spectral components in the output signal 202. In these embodiments, a spectral analyzer (not shown) can be disposed at the output port 230 to measure the spectral power of the output signal 202.

In some embodiments, the path failure can be determined based on the signal-to-noise ratio (SNR) of the output signal 202. In some embodiments, the path failure can be determined based on the bit error rate (BER) in the data received at the output port 230. In some embodiments, any of the above mentioned measurements can be performed at the switches 220a and/or 220b to detect path failures.

Figure 3:
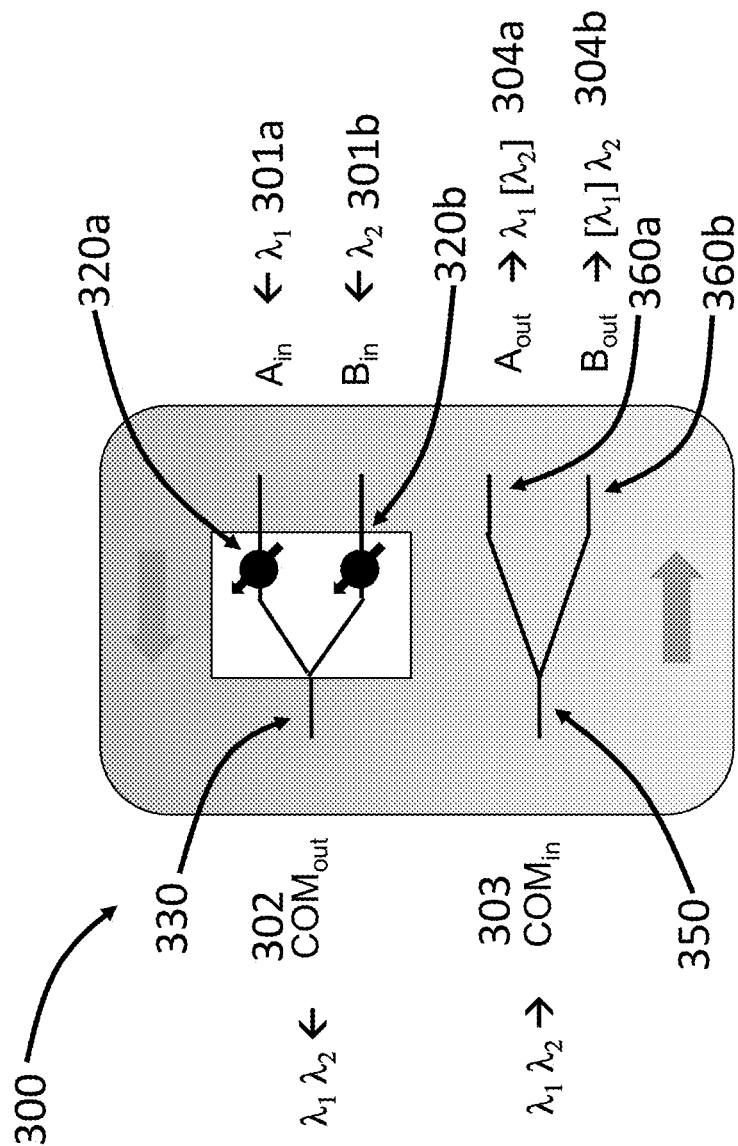
FIG. 3 shows a schematic of a reconfigurable optical switch configured in multi-direction mode, according to some embodiments.

FIG. 3 shows a schematic of a reconfigurable optical switch 300 configured in multi-direction mode, according to some embodiments. The hardware structure of the reconfigurable optical switch 300 can be identical to the hardware structure of the reconfigurable optical switch 200 shown in FIG. 2, but the switches are configured such that the reconfigurable optical switch 300 functions as a multi-directional multiplexer.

The reconfigurable optical switch 300 includes a first switch 320a to receive a first optical signal 301a and a second switch 320b to receive a second signal 301b. An output port 330 is in optical communication with both switches 320a and 320b to transmit an output signal 302, which is the sum of possible signals transmitted through the two switches 320a and 320b. The reconfigurable optical switch 300 also includes an input port 350 to receive an input optical signal 303 and split the input optical signal 303 into two portions 304a and 304b, each of which is directed into a corresponding path 360a and 360b.

The switches 320a and 320b in the reconfigurable optical switch 300 are both set in the "pass" state to pass the corresponding optical signal 301a and 301b. Accordingly, the output signal 302 is a sum of the optical signals 301a and 301b. In some embodiments, the first optical signal 301a includes a first spectral component at a first wavelength $\lambda_1$, and the second optical signal 301b includes a second spectral component at a second wavelength $\lambda_2$ different from the first wavelength $\lambda_1$. Accordingly, the output signal 320 includes two spectral components at wavelengths $\lambda_1$ and $\lambda_2$. In some embodiments, the output signal 302 can be sent to multiple receivers for coherent detection via a de-multiplexer, such as a passive splitter. FIGS. 2 and 3 illustrate that by simple reconfiguration of the switches (220a/b and 320a/b), one can receive channels from multiple directions simultaneously. This approach allows a protection switch to be reconfigured as an element of a multi-directional mux/demux through software programmability.

In some embodiments, the first optical signal 301a can include a first group of spectral components at wavelengths $\lambda_1, \lambda_2 \ldots$ and $\lambda_N$, where N is the number of spectral components in the first optical signal 301a and is a positive integer. The second optical signal 302a can include a second group of spectral components at wavelengths $\lambda_{N+1}$, $\lambda_{N+2}$ . . . and $\lambda_{N+M}$, where M is the number of spectral components in the second optical signal 301b and is also a positive integer. In some embodiments, N and M can be identical. In some embodiments, N and M can be different. In some embodiments, each wavelength $\lambda_j$, where j=1, 2, . . . N+M is different from another wavelength $\lambda_i$, where i≠j.

In some embodiments, optical signals having multiple spectral components are sent to the reconfigurable optical switch 300 and second state multiplexing can be used to resolve possible wavelength contention. For example, a first ROADM (e.g., the ROADM 110a shown in FIG. 1) can be disposed before (i.e., upstream) the first switch 320a and a second ROADM (e.g., the ROADM 110b shown in FIG. 1) can be disposed before (i.e., upstream) the second switch 320b. In some embodiments, the first ROADM is configured to pass spectral components at the first wavelength $\lambda_1$ and block other spectral components, while the second ROADM is configured to pass spectral components at the second wavelength $\lambda_2$ and block other spectral components. In this manner, the first ROADM generates the first optical signal 301a and the second ROADM generates the second optical signal 301b.

In some embodiments, the first ROADM is configured to pass spectral components at a first group of wavelengths and the second ROADM is configured to pass spectral components at a second group of wavelengths. In this case, each of the first optical signal 301a and the second optical signal 301b can include multiple spectral components, and the reconfigurable optical switch 300 can function as a multi-directional multiplexer to multiplex two super channels.

In some embodiments, the transmission section of the reconfigurable optical switch 300 can be configured to receive the input signal 303 including multiple spectral components (e.g., at $\lambda_1$ and $\lambda_2$, as illustrated in FIG. 3). The input signal 303 is split into two copies, which are directed to the two paths 360a and 360b. Second stage multiplexing, such as ROADMs, can be used to block the spectral component at $\lambda_2$ in the first path 360a and block the spectral component at $\lambda_1$ in the second path 360b. These two spectral components can then be delivered to two different destinations in an optical network.

Figure 4:
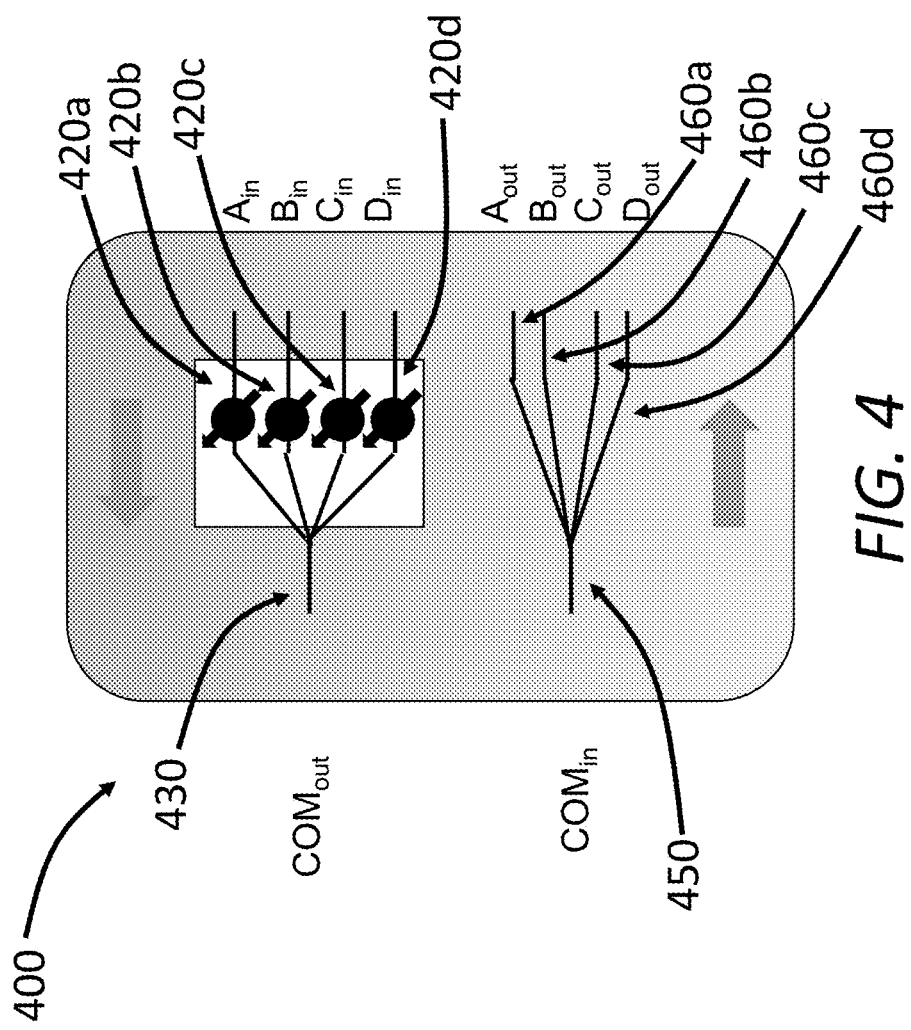
FIG. 4 shows a schematic of a reconfigurable optical switch including four switches, according to some embodiments.

FIG. 4 shows a schematic of a reconfigurable optical switch 400 including four switches 420a, 420b, 420c, and 420d (collectively referred to as switches 420). A common output port 430 is in optical communication with all the switches 420 to transmit an output signal that is a sum of possible signals transmitted through the switches 420. The reconfigurable optical switch 400 also includes a transmission section that includes an input port 450 and four transmission paths 460a, 460b, 460c, and 460d (collectively referred to as transmission paths 460).

In some embodiments, the reconfigurable optical switch 400 can be configured as a protection switch and the optical signals received by the four switches 420 can be substantially identical. In the event that one optical channel (e.g., the channel including the first switch 420a) has a failure, the reconfigurable optical switch 400 can select any of the remaining three channels for optical communication (e.g., by closing the first switch 420a and opening any one of the remaining three switches 420b, 420c, or 420d).

In some embodiments, the reconfigurable optical switch 400 can be configured as a multi-directional multiplexer. In these embodiments, all switches 420 are set in the "pass" state to pass the corresponding optical signals. Therefore, the reconfigurable optical switch 400 can multiplex optical signals from four directions.

In some embodiments, the reconfigurable optical switch 400 can be configured as a hybrid of a protection switch and a multi-directional multiplexer. For example, the first switch 420a and the second switch 420b can receive optical signals that are identical, i.e., $A_{in}=B_{in}$. The third switch 420c and the fourth switch 420d can receive optical signals that are identical, i.e., $C_{in}=D_{in}$, but $A_{in} \neq B_{in}$. In this case, the first switch 420a and the second switch 420b can collectively function as a first protection switch, and the third switch 420c and the fourth switch 420d can function as a second protection switch. The four switches 420 then collectively function as a multi-directional multiplexer to generate an output signal that is the sum of $A_{in}/B_{in}$ and $C_{in}/D_{in}$.

In FIG. 4, four switches 420 are shown for illustration purposes only. In practice, the number of switches 420 can be less than or greater than 4 (e.g., 3 switches, 5 switches, 6 switches, 7 switches, 8 switches, 10 switches, 12 switches, or more, including any values and sub ranges in between). In some embodiments, the number of switches 420 can be $2^N$, where N is a positive integer. For example, the number of switches 420 can be 2, 4, 8, 16, 32, 64, or 128.

Figure 5:
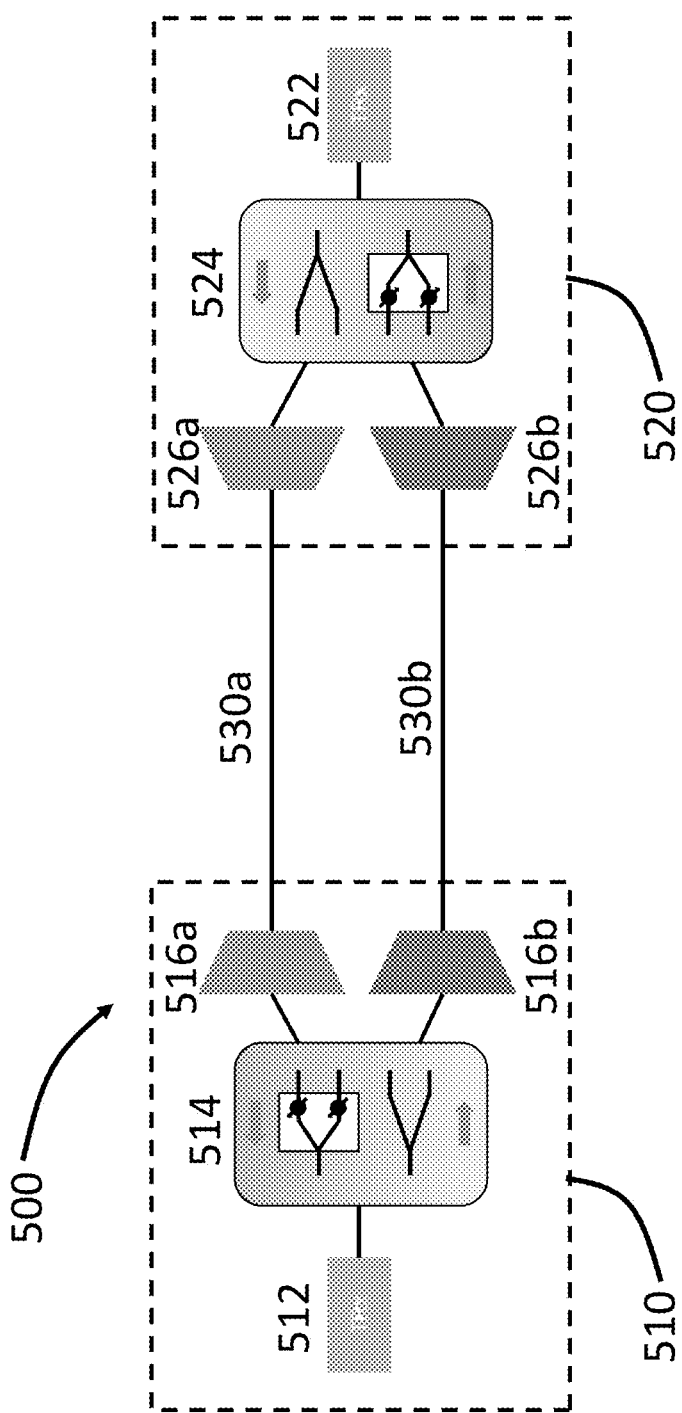
FIG. 5 shows a schematic of an optical network including a reconfigurable optical switch for optical channel (OCH) protection and multi-directional multiplexing, according to some embodiments.

FIG. 5 shows a schematic of an optical network 500 using reconfigurable optical switches for optical channel (OCH) protection and multi-directional multiplexing, according to some embodiments. The optical network 500 includes a first node 510 and a second node 520 communicating with each other via two optical channels 530a and 530b. The first node 510 includes a transceiver 512 to transmit an optical signal. The optical signal is sent to a reconfigurable optical switch 514, which splits the optical signal into two portions: the first portion is delivered to a first mux/demux 516a connected to the first path 530a, and the second portion is delivered to a second mux/demux 516b connected to the second path 530b. The second node 520 includes a first mux/demux 526a connected to the first path 530a and a second mux/demux 526b connected to the second path 530b. A second reconfigurable optical switch 524 is coupled to both mux/demux 526a and 526b and transmits/receives signals from a transceiver 522. The reconfigurable optical switches 514 and 524 can be substantially identical to any of the reconfigurable optical switches described herein and detailed description of them are not repeated.

The transceivers 512 and 522 can include one or more types of transmitters. In some embodiments, the transmitter can include a coherent transmitter. In some embodiments, the transmitter can include a C-form pluggable generation (CFP) transmitter. In some embodiments, the transmitter can include a CFP4 transmitter, which can be coherent or non-coherent. In some embodiments, the transmitter can include a C-form pluggable generation 2—analog coherent optics (CFP2-ACO) transmitter that is coupled with a digital signal processor (DSP) chip through a pluggable interface.

In some embodiments, the transmitter can include a coherent in-phase/quadrature transmitter integrated together with a DSP within a physical module. In some embodiments, the transmitter can include a C-form pluggable generation—digital coherent optics (CFP-DCO) transmitter integrated with a DSP and an optical front end. In some embodiments, the transmitter can include a Quad Small Form-factor Pluggable (QSFP) transmitter. In some embodiments, the transmitter can include a QSFP28 transmitter. These transmitters can be coherent or incoherent.

In operation, the communication between the first node 510 and the second node 520 is bi-directional. The receiving ends (also referred to as the tail-end) of the reconfigurable optical switches 514 and 524 include two 1×1 switches. In some embodiments, the reconfigurable optical switches 514 and 524 can be employed for path protection. In these embodiments, one switch in each reconfigurable optical switch (514 and 524) is in the pass state and the other switch is in the block state to allow communication between the two nodes 510 and 520 via either the first path 530*a* or the second path 530*b*.

In some embodiments, both switches in each reconfigurable optical switch (514 and 524) are in the pass state to collect signals from both paths 530*a* and 530*b*. In some embodiments, one reconfigurable optical switch (e.g., 514) can be employed for path protection for communication from the second node 520 to the first node 510, while the other reconfigurable optical switch (e.g., 524) can be employed for multi-directional multiplexing for communication on the reverse direction, i.e., from the first node 510 to the second node 520. Although one transceiver (512 and 522) is shown on each node (510 and 520, respectively), in practice, each node 510 and 520 can include multiple transceivers. A power splitter can be disposed between the reconfigurable optical switch (514 and 524) and the transceivers (512 and 522) to split the optical signals to each transceiver.

Figure 6:
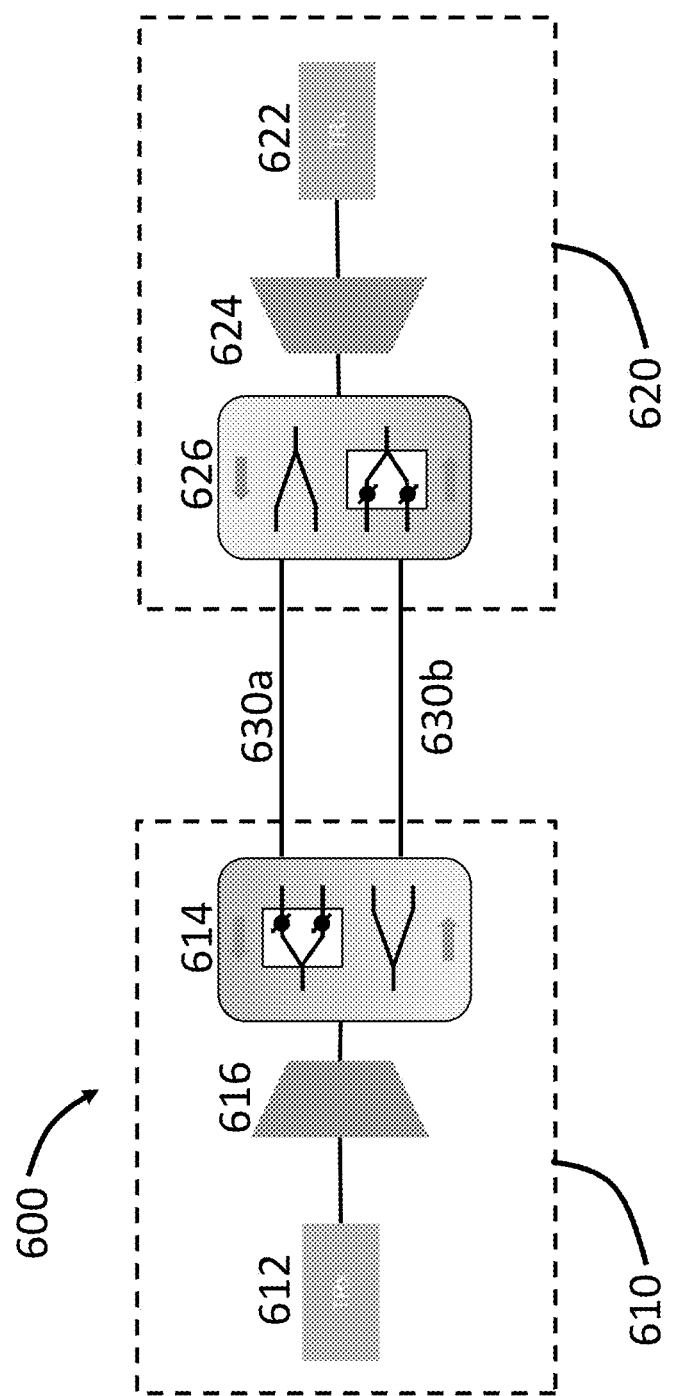
FIG. 6 shows a schematic of an optical network including a reconfigurable optical switch for optical multiplexing section (OMS) protection and multi-directional multiplexing, according to some embodiments.

FIG. 6 shows a schematic of an optical network 600 using reconfigurable optical switches for optical multiplexing section (OMS) protection and multi-directional multiplexing, according to some embodiments. The optical network 600 includes a first node 610 and a second node 620 in communication with each other via two paths 630*a* and 630*b*. The description below uses the communication from the first node 610 to the second node 620 for illustration purposes, and the communication on the reverse direction (i.e. from the second node 620 to the first node 610) can be substantially symmetric.

The first node 610 includes a transceiver 612 to provide (or receive) optical signals that are sent to a mux/demux 616. A reconfigurable optical switch 614 receives the optical signals from the mux/demux 616 and splits the optical signals into the first path 630*a* and 630*b*. The second node 620 also includes a reconfigurable optical switch 626 connected to both paths 630*a* and 630*b* to collect signals transmitted from these two paths 630*a* and 630*b*. A mux/demux 624 is employed to receive signals from the reconfigurable optical switch 626 and send the signals to a transceiver 622.

In some embodiments, the reconfigurable optical switch 626 can be employed for path protection per multiplexing (e.g., one switch in the pass state and the other switch in the block state). In some embodiments, the reconfigurable optical switch 626 can be employed for multi-directional multiplexing (e.g., both switches are in the pass state). In some embodiments, a controller (not shown in FIG. 6) can be used to switch between these two modes remotely, without changing any hardware components in the optical network. Although one transceiver (612 and 622) is shown on each node (610 and 620, respectively), in practice, each node 610 and 620 can include multiple transceivers. A power splitter can be disposed between the reconfigurable optical switch (614 and 624) and the transceivers (612 and 622) to split the optical signals to each transceiver.

Figure 7:
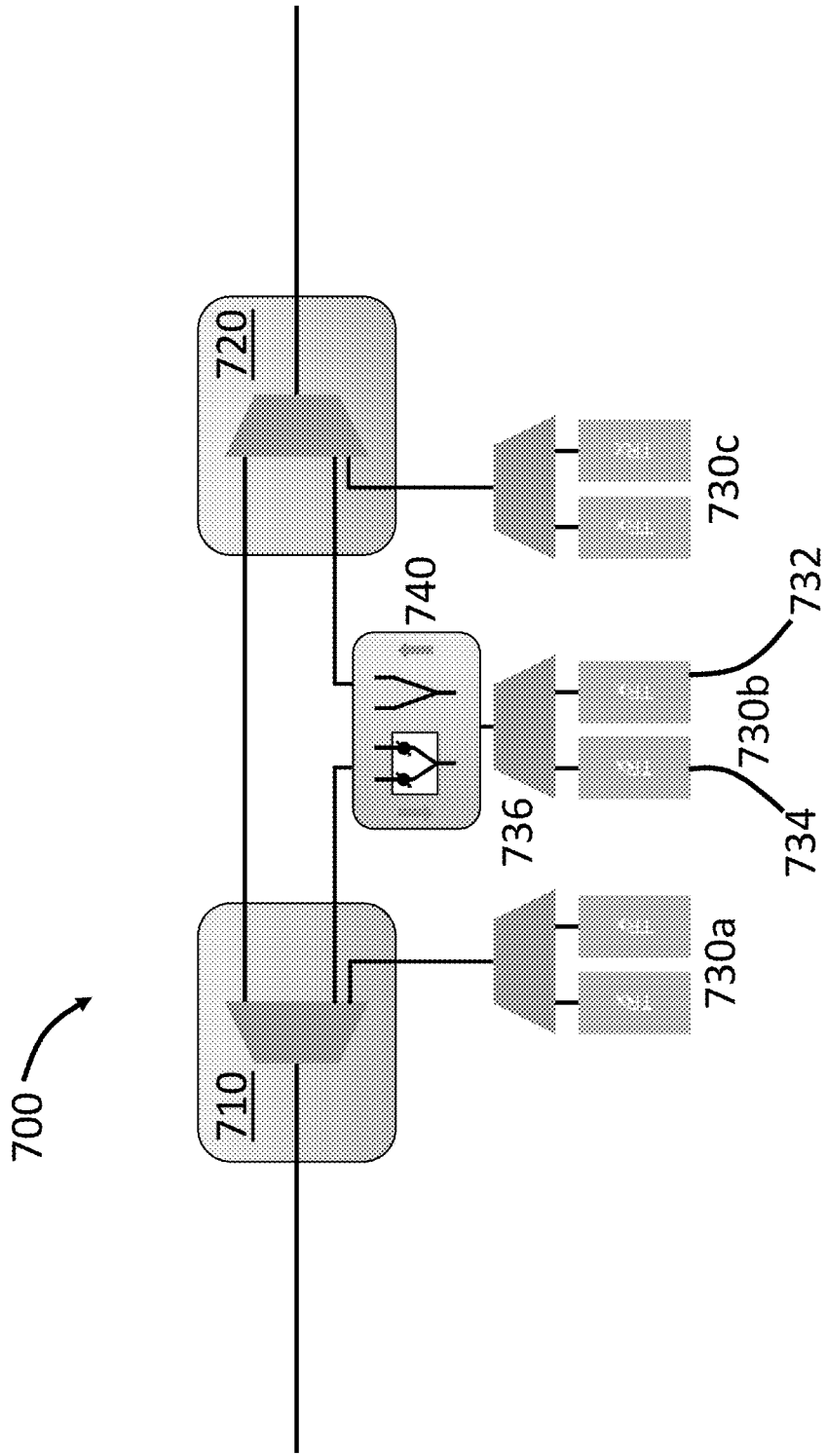
FIG. 7 shows a schematic of an optical network including group multiplexing and using a reconfigurable optical switch for path protection and multi-directional multiplexing, according to some embodiments.

FIG. 7 shows a schematic of an optical network 700 including group multiplexing and using a reconfigurable optical switch for path protection and multi-directional multiplexing. The network 700 includes a first node 710, a second node 720, and multiple add/drop stages 730*a*, 730*b*, and 730*c* connected between the first node 710 and the second node 720. The description herein uses the second stage 730*b* for illustration purposes, but other stages (e.g., 730*a* and 730*c*) can have similar structures and functions.

The add/drop stage 730*b* includes a pair of transceivers 732 and 734 (both can be bi-directional with add/drop functions), a mux/demux 736 coupled to the transceivers 732 and 734, and a reconfigurable optical switch 740 connected between the mux/demux 736 and the two nodes 710 and 720. The reconfigurable optical switch 740 can be substantially identical to any of the reconfigurable optical switches described above and detailed description is not repeated.

In some embodiments, the reconfigurable optical switch 740 can have only one of the two switches in the pass state and the other switch in the block state. In this manner, the second stage 730*b* can receive signals from either the first node 710 or the second node 720. In some embodiments, the reconfigurable optical switch 740 can have both switches in the pass state to receive signal from both nodes 710 and 720, i.e., multi-directional multiplexing.

Figure 8:
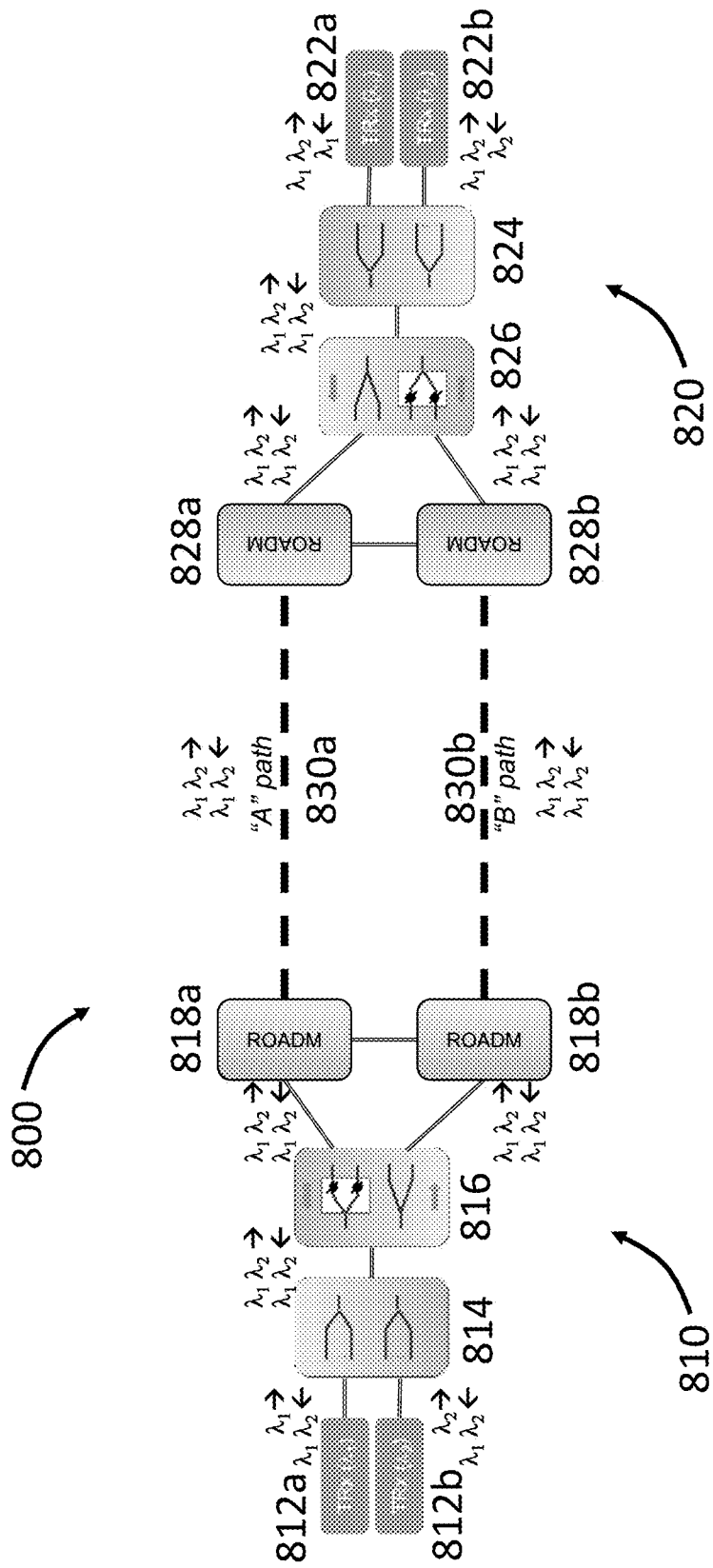
FIG. 8 shows a schematic of an optical network including a reconfigurable optical switch for path protection, according to some embodiments.

FIG. 8 shows a schematic of an optical network 800 including a reconfigurable optical switch for path protection, according to some embodiments. The optical network 800 includes a first node 810 and a second node 820 in communication with each other via two possible paths 830*a* and 830*b*. The following description uses the communication from the first node 810 to the second node 820 for illustration purposes, and the communication on the reverse direction (i.e., from the second node 820 to the first node 810) can be substantially symmetric.

The first node 810 includes a pair of transceivers 812*a* and 812*b* to deliver a first spectral component at a first wavelength $\lambda_1$ and a second spectral component at a second optical signal $\lambda_2$, respectively. The two spectral components are combined using a combiner 814 to form a single optical signal, referred to as the transmission signal. The first node 810 also includes a reconfigurable optical switch 816 to split the transmission signal into a first portion and a second portion, each of which include both spectral components at $\lambda_1$ and $\lambda_2$. The first portion is sent to a first ROADM 818*a*, which in turn delivers the first portion to the first path 830*a*. The second portion is sent to a second ROADM 818*b*, which in turn delivers the second portion to the second path 830*b*.

On the receiving end, the second node 820 includes a first ROADM 828*a* to receive the first portion of the transmission signal from the first path 830*a* and a second ROADM 828*b* to receive the second portion of the transmission signal from the second path 830*b*. A reconfigurable optical switch 826 is connected to both ROADMs 828*a* and 828*b*. More specifically, the reconfigurable optical switch 826 incudes a first switch connected to the first ROADM 828*a* and a second switch connected to the second ROADM 828*b*. In some embodiments, a splitter 824 is employed in the second node 820 to direct the first spectral component at $\lambda_1$ to a first transceiver 822*a* and direct the second spectral component at $\lambda_2$ to a second transceiver 822*b*. In some embodiments, the splitter 824 is configured to direct both spectral components at $\lambda_1$ and $\lambda_2$ to each transceiver 822*a* and 822*b* (as shown in FIG. 8).

In operation, one switch in the reconfigurable optical switch 826 is in the pass state and the other switch in the reconfigurable optical switch 826 is in the block state for path protection. For example, the top switch in the reconfigurable optical switch 826 can be initially set in the pass state to allow communication between the two nodes 810 and 820 via the first path 830*a*. In the event that the first path 830 fails, the system 800 can then use the second path 830*b* for communication by switching the top switch in the reconfigurable optical switch 826 into the block state and switching the bottom switch in the reconfigurable optical switch 826 into the pass state. In this manner, both wavelengths $\lambda_1$ and $\lambda_1$ are protected.

Figure 9:
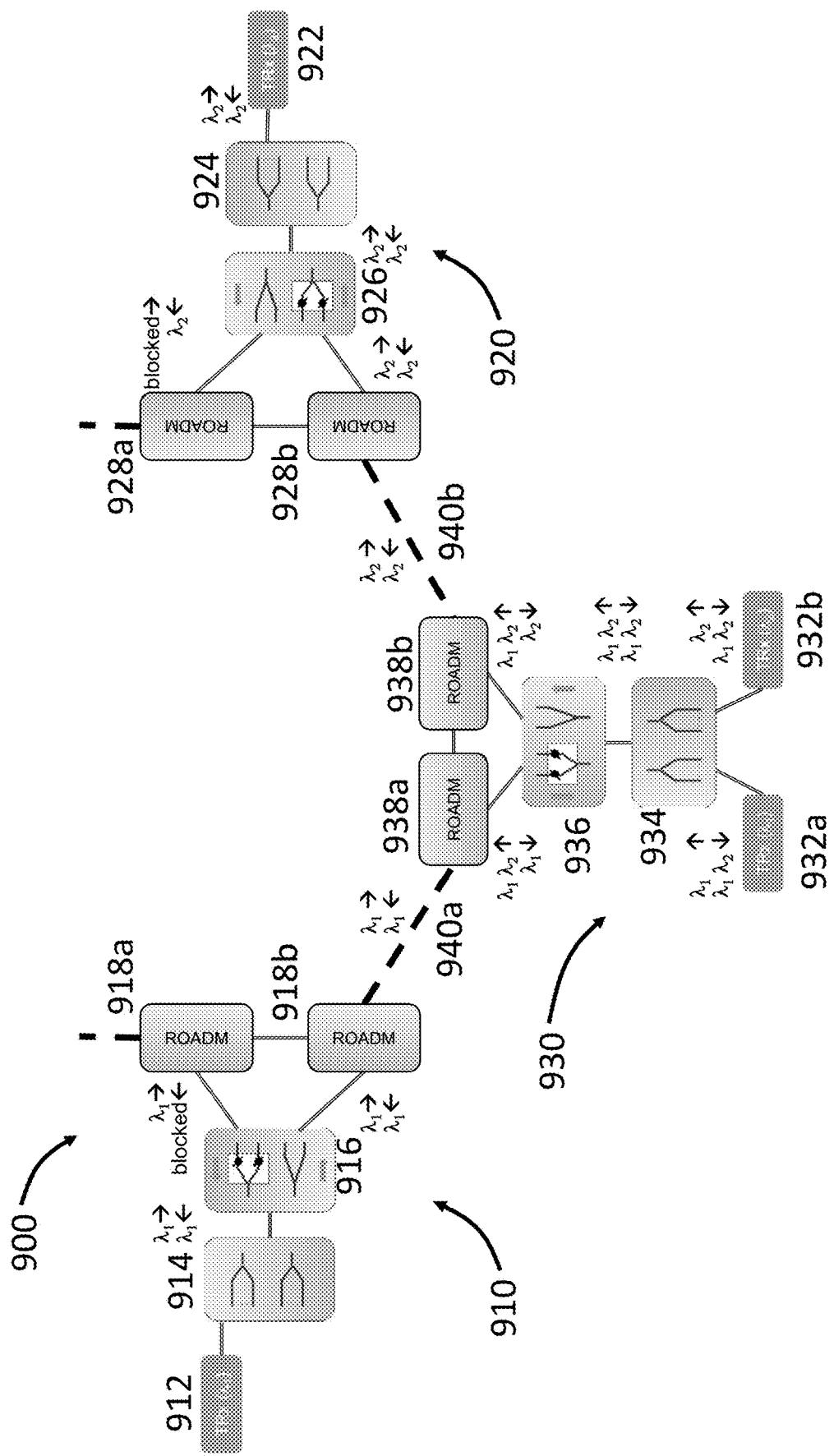
FIG. 9 shows a schematic of an optical network including a reconfigurable optical switch for multi-directional multiplexing, according to some embodiments.

FIG. 9 shows a schematic of an optical network 900 including a reconfigurable optical switch for multi-directional multiplexing, according to some embodiments. The optical network 900 includes a first node 910, a second node 920, and a third node 930. For illustration purposes only, FIG. 9 shows only the first path 940a between the first node 910 and the third node 930, and the second path 940b between the second node 920 and the third node 930. Other paths are also possible (e.g., a path between the first node 910 and the second node 920).

The first node 910 includes a transceiver 912 to deliver a first spectral component at $\lambda_1$ and a reconfigurable optical switch 916 to split the first spectral component into a first portion and a second portion. The first portion is sent to a first ROADM 918a and the second portion is sent to a second ROADM 918b that is connected to the first path 940a toward the third node 930. An optional combiner 914 is also included in the first node 910 to combine spectral components when multiple transceivers are used.

The second node 920 includes a transceiver 922 to deliver a second spectral component at $\lambda_2$ and a reconfigurable optical switch 926 to split the second spectral component into a first portion and a second portion. The first portion is sent to a first ROADM 928a and the second portion is sent to a second ROADM 928b that is connected to the second path 940b toward the third node 930. An optional combiner 924 is also included in the second node 920 to combine spectral components when multiple transceivers are used.

The third node 930 includes a first ROADM 938a connected to the first path 940a to receive the first spectral component at $\lambda_1$ and a second ROADM 938b connected to the second path 940b to receive the second spectral component at $\lambda_2$. The first ROADM 938a is configured to pass spectral components at $\lambda_1$ and block spectral components at other wavelengths (e.g., $\lambda_2$) to avoid interference. Similarly, the second ROADM 938b is configured to pass spectral component at $\lambda_2$ and block spectral components at other wavelengths (e.g., $\lambda_1$) to avoid interference.

The third node 930 also includes a reconfigurable optical switch 936 connected to the two ROADMs 938a and 938b to combine the first spectral component at $\lambda_1$ with the second spectral component at $\lambda_2$. The combined signal is delivered to a splitter 934, which directs the first spectral component to a first transceiver 932a operating at $\lambda_1$ and directs the second spectral component to a second transceiver 932b operating at $\lambda_2$.

Figure 10A:
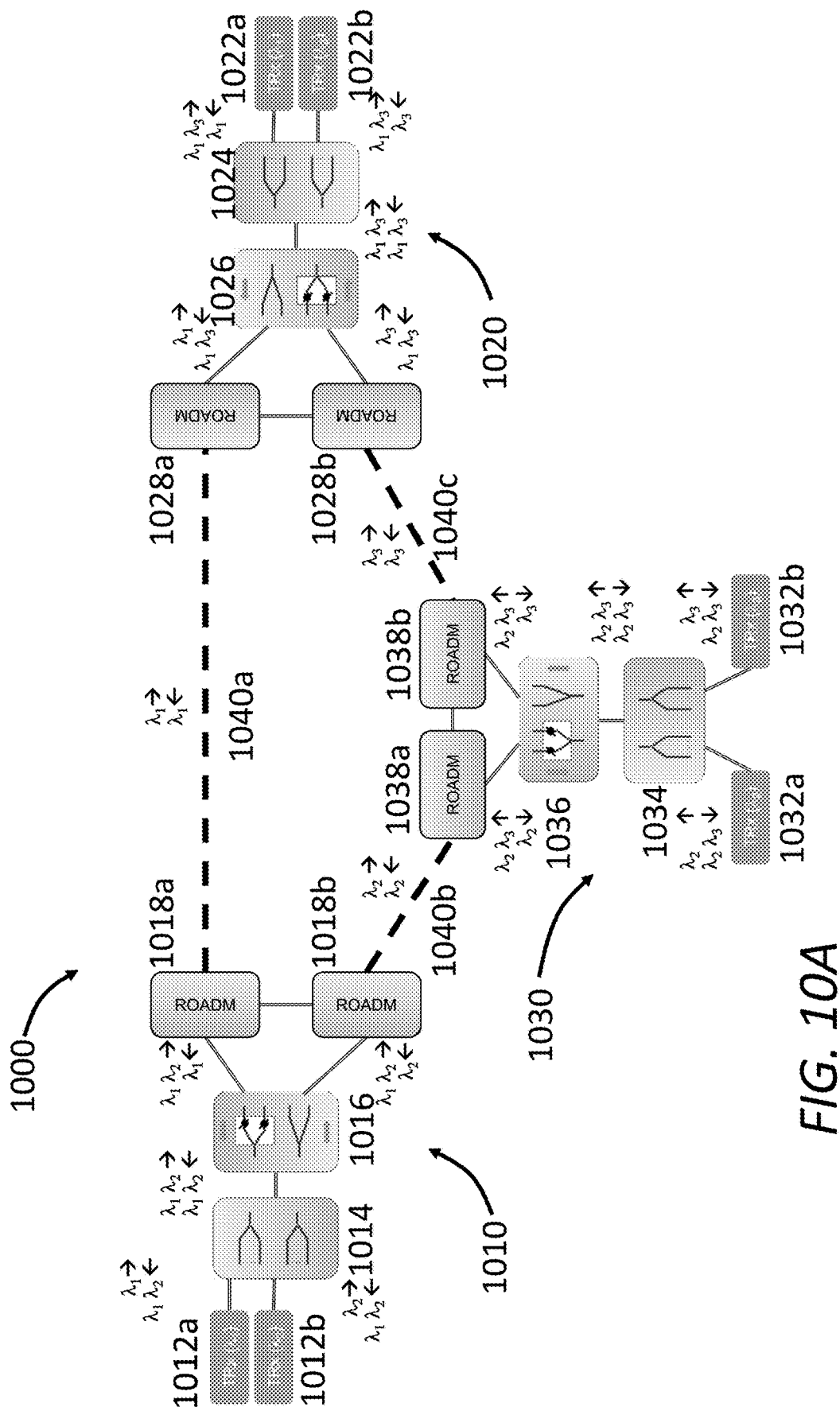
FIGS. 10A and 10B each illustrate a schematic of an optical network having reconfigurability between path protection and multi-directional multiplexing of an optical network, according to some embodiments.
Figure 10B:
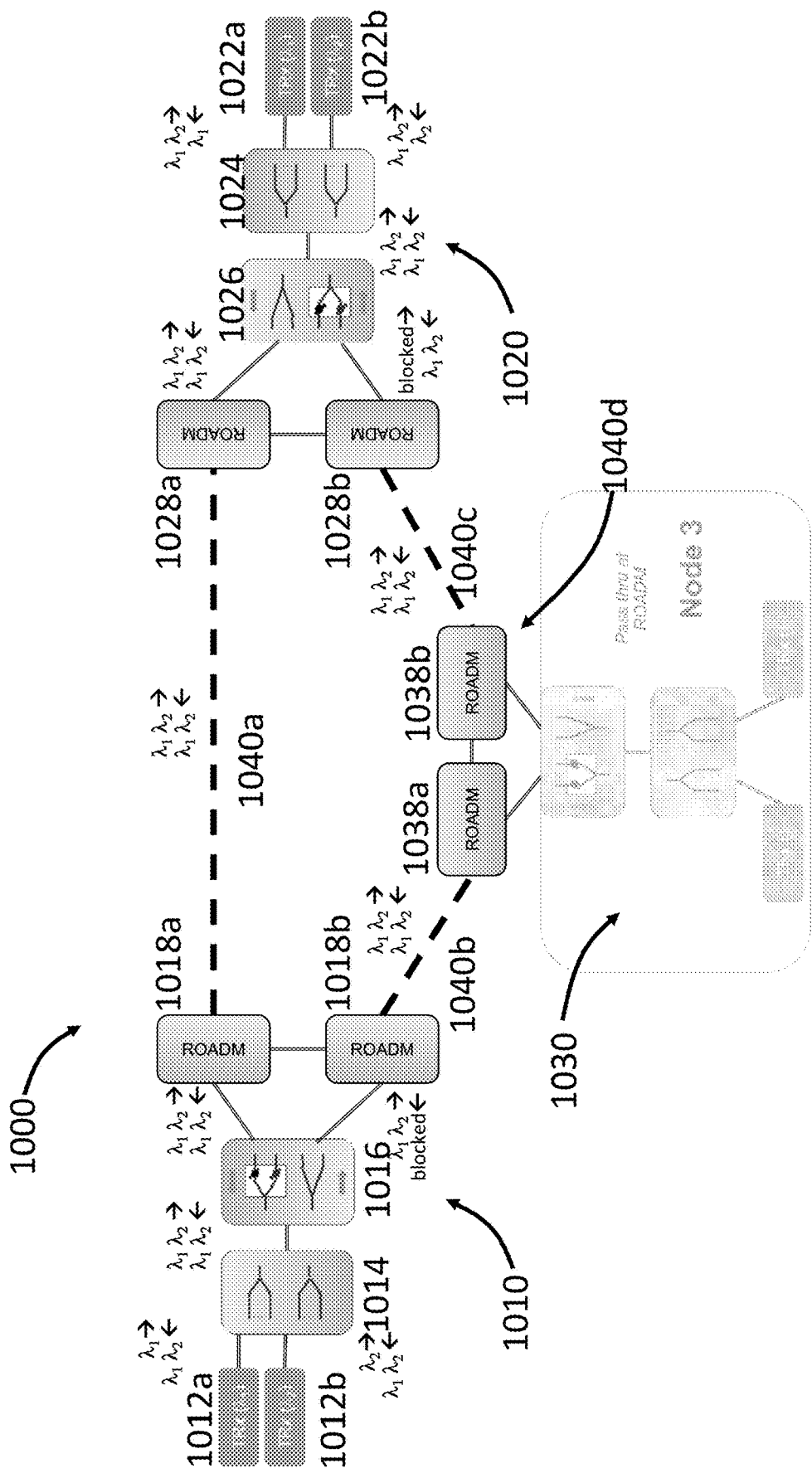

FIGS. 10A and 10B each illustrate a schematic of an optical network 1000 having reconfigurability between path protection and multi-directional multiplexing of an optical network, according to some embodiments. As shown in FIG. 10A, the optical network 1000 includes a first node 1010, a second node 1020, and a third node 1030. The first node 1010 includes a pair of transceivers 1012a operating at $\lambda_1$ and 1012b operating at $\lambda_2$. A combiner 1014 is used to combine the two spectral components at $\lambda_1$ and $\lambda_2$. The first node 1010 also includes a reconfigurable optical switch 1016 to split the combined signal into a first portion directed to a first ROADM 1018a and a second portion directed to a second ROADM 1018b. The first ROADM 1018a is connected to a first path 1040a toward the second node 1020 and the second ROADM 1018b is connected to a second path 1040b toward the third node 1030.

The second node 1020 includes a pair of transceivers 1022a operating at $\lambda_1$ and 1022b operating at $\lambda_3$, respectively. A combiner 1024 is used to combine the two spectral components at $\lambda_1$ and $\lambda_3$. The second node 1020 also includes a reconfigurable optical switch 1026 to split the combined signal into a first portion directed to a first ROADM 1028a and a second portion directed to a second ROADM 1028b. The first ROADM 1028a is connected to the first path 1040a toward the first node 1010 and the second ROADM 1028b is connected to a third path 1040c toward the third node 1030.

The third node 1030 includes a pair of transceivers 1032a operating at $\lambda_2$ and 1032b operating at $\lambda_3$. A combiner 1034 is used to combine the two spectral components at $\lambda_2$ and $\lambda_3$. The first node 1030 also includes a reconfigurable optical switch 1036 to split the combined signal into a first portion directed to a first ROADM 1038a and a second portion directed to a second ROADM 1038b. The first ROADM 1038a is connected to the second path 1040b toward the first node 1010 and the second ROADM 1038b is connected to the third path 1040c toward the second node 1020.

In FIG. 10A, the network 1000 operates at the broadcast mode. In this mode, the ROADM 1018a in the first node 1010 is configured to pass the spectral component at $\lambda_1$ (and block the spectral component at $\lambda_2$). Therefore, the communication between the first node 1010 and the second node 1020 via the first path 1040a is at $\lambda_1$. The ROADM 1018b in the first node is configured to pass the spectral component at $\lambda_2$ (and block the spectral component at $\lambda_1$). Therefore, the communication between the first node 1010 and the third node 1030 is at $\lambda_2$. In the second node 1020, the ROADM 1028b is configured to pass the spectral component at $\lambda_3$ (and block the spectral component at $\lambda_1$). Accordingly, the communication between the second node 1020 and the third node 1030 is at $\lambda_3$.

From the perspective of the third node 1030, the reconfiguration optical switch 1036 is configured to receive the spectral component at $\lambda_2$ from the first node 1010 and receive the spectral component at $\lambda_3$ from the second node 1020. These two spectral components are combined by the reconfigurable optical switch 1036 and the combined signal can be then spectrally split by the combiner 1034 (now functioning as a splitter). The spectral component at $\lambda_2$ can be directed to the transceiver 1032a and the spectral component at $\lambda_3$ can be directed to the transceiver 1032b.

In some embodiments, the combined signal after the reconfigurable optical switch 1036 can be directed to both transceivers 1032a and 1032b without spectral separation. The transceivers 1032a and 1032b can include demultiplexer(s) or other devices to separate the spectral components from each other.

From the perspective of the second node 1020, the reconfigurable optical switch 1026 receives the spectral component at $\lambda_1$ from the first node and receives the spectral component at $\lambda_3$ from the third node 1030. In the first node 1010, the reconfigurable optical switch 1016 receives the spectral component at $\lambda_1$ from the second node 1020 and receives the spectral component at $\lambda_2$ from the third node 1030. Therefore, each node (1010, 1020, and 1030) is operating in multi-directional multiplexing mode to receive different spectral components from the other two nodes.

In FIG. 10B, the network 1000 operates at the path protection mode. In this mode, the third node 1030 is bypassed (it is shown partially visible for illustration purposes), and the two ROADMs 1038a and 1038b in the third node 1030 can function as a bridge to connect the paths 1040b and 1040c into a continuous one, referred to as 1040d in this section.

In optical protection mode, the ROADMs 1018a and 1018b in the first node are configured to pass spectral components at both $\lambda_1$ and $\lambda_2$. The two transceivers 1022a and 1022b in the second node 1020 are also configured to operate at $\lambda_1$ and $\lambda_2$, respectively. In addition, the two ROADMs 1028a and 1028b are configured to transmit spectral components at both $\lambda_1$ and $\lambda_2$. Therefore, signals having spectral components at $\lambda_1$ and $\lambda_2$ can be communicated between the first node 1010 and the second node 1020 via either the first path 1040a or the second path 1040d. The reconfigurable optical switch 1026 can select which path to use for the traffic from the first node 1010 to the second node 1020, and the reconfigurable optical switch 1016 in the first node can select which path to use for the traffic along the reverse direction, i.e., from the second node 1020 to the first node 1010.

For example, the reconfigurable optical switch 1026 can have its top switch in the pass state and the bottom switch in the block state to choose the first path 1040a for receiving communication from the first node 1010. Alternatively, the reconfigurable optical switch 1026 can have its top switch in the block state and the bottom switch in the pass state to choose the second path 1040d for receiving communication from the first node 1010

FIGS. 10A and 10B illustrate that reconfigurability between optical protection mode and broadcast mode can be readily achieved by changing the status of the reconfigurable optical switches. In other words, the reconfiguration does not change any of the hardware component (e.g., ROAMDs, switches, combiners, and/or transceivers) in the optical network 1000. The broadcast mode allows for a more efficient use of the multiplex ports in the network 1000 by allowing common equipment to be deployed and then application determined by later configuration or reconfiguration. In contrast, known methods to switch between optical protection and broadcasting usually include physical changes of the optical path in the network (e.g., inserting or removing an optical protection switch from the path). These changes are typically not a touch-less operation and therefore can be much more cumbersome to achieve, with greater potential to cause errors during the reconfiguration.

Figure 11:
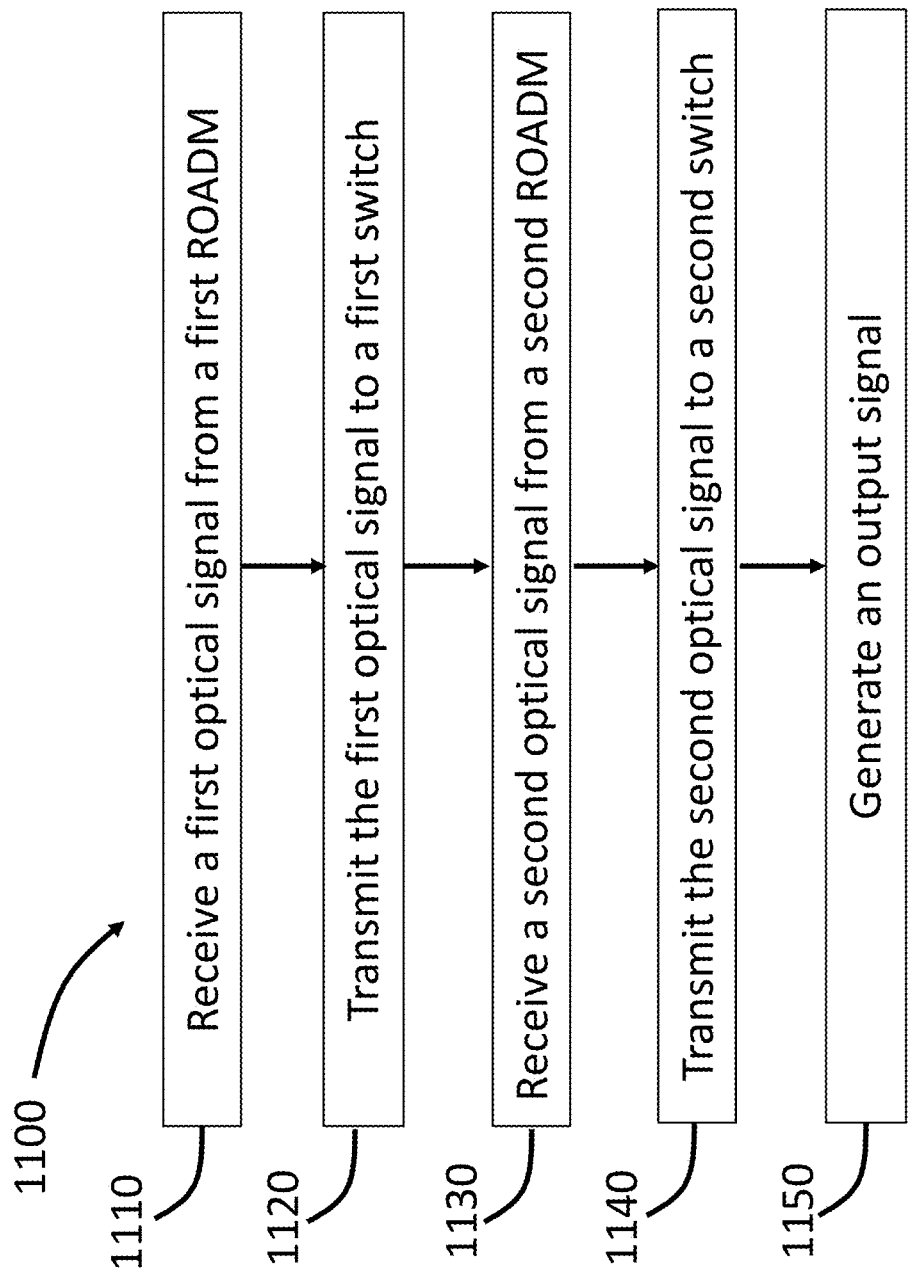
FIG. 11 illustrates a method of optical communication including reconfigurable optical switching, according to some embodiments.

FIG. 11 illustrates a method 1100 of optical communication, according to some embodiments. The method 1100 includes, at 1110, receiving a first optical signal from a first reconfigurable optical add/drop multiplexer (ROADM). The first optical signal is then transmitted to a first switch in optical communication with the first ROADM and switchable between a first state and a second state, at 1120. The first switch is configured to transmit the first optical signal at the first state and block the first optical signal at the second state. The method 1100 also includes receiving a second optical signal from a second ROADM at 1130 and transmitting the second optical signal to a second switch at 1140. The second switch is in optical communication with the second ROADM and switchable between the first state and the second state. The second switch is configured to transmit the second optical signal at the first state and block the second optical signal at the second state. At 1150, an output signal is generated by combining possible optical signals transmitted through the first switch and the second switch.

In some embodiments, the first switch and the second switch include a variable optical attenuator (VOA). The low-loss state of the VOA can be used as the first state to pass optical signals and the high-loss state of the VOA can be used as the second state to block optical signals.

In some embodiments, the first ROADM is configured to transmit a first spectral component at a first wavelength and block spectral components at other wavelengths. The second ROADM is configured to transmit a second spectral component at a second wavelength and block spectral components at other wavelengths. The first wavelength and the second wavelength are different. In these embodiments, the output signal can be generated by combining the first spectral component and the second spectral component. In some embodiments, the first spectral component and the second spectral component are delivered from different directions and the method 1100 can be employed for multi-directional multiplexing.

In some embodiments, the first ROADM is configured to transmit a first group of spectral component at a first group of wavelengths and block spectral components at other wavelengths. The second ROADM is configured to transmit a second group of spectral components at a second group of wavelengths and block spectral components at other wavelengths. Each group of spectral components can be multiplexed into a single fiber or waveguide to travel together and form a super channel for data communication.

In some embodiments, the output signal includes multiple spectral components, and the method 1100 further includes demultiplexing the output signal and directing each spectral component into a corresponding receiver. In some embodiments, a separate demultiplexer can be used to demultiplex the output signal. In some embodiments, optical splitters are used to demultiplex the output signal.

In some embodiments, the method 1100 further includes detecting at least one attribute of the first optical signal. In response to the attribute of the first optical signal being unsatisfactory (e.g., less than a threshold value), the first switch is switched to the second state to block the first optical signal and the second switch is switched to the first state to transmit the second optical signal. In some embodiments, the attribute of the first optical signal includes the overall amplitude (or power) of the first optical signal. In some embodiments, the attribute of the first optical signal includes the amplitude (or power) of one spectral component in the first optical signal. In some embodiments, the attribute of the first optical signal includes the signal-to-noise ratio (SNR) of the first optical signal. In some embodiments, the attribute of the first optical signal includes the bit error rate (BER) of the first optical signal.

In some embodiments, the method 1100 further includes switching between a first operation mode and a second operation mode. In the first operation mode, the first switch is configured in the first state and the second switch is configured in the second state for path protection. In the second operation mode, both the first switch and the second switch are configured in the first state for multi-directional multiplexing. The switching between these two modes can be achieved remotely by a controller.

In some embodiments, the method 1100 further includes receiving a third optical signal from a third ROADM and transmitting the third optical signal to a third switch in optical communication with the third ROADM and switchable between the first state and the second state. The third switch is configured to transmit the third optical signal at the first state and block the third optical signal at the second state. In these embodiments, the output signal is generated by combining possible signals transmitted through the first switch, the second switch, and the third switch.

While various embodiments have been described and illustrated herein, a variety of other means and/or structures for performing the function and/or obtaining the results and/or one or more of the advantages described herein, and each of such variations and/or modifications are possible. More generally, all parameters, dimensions, materials, and configurations described herein are meant to be examples and that the actual parameters, dimensions, materials, and/or configurations will depend upon the specific application or applications for which the disclosure is used. It is to be understood that the foregoing embodiments are presented by way of example only and that other embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

As used herein, a "module" can be, for example, any assembly and/or set of operatively-coupled electrical components associated with performing a specific function, and can include, for example, a memory, a processor, electrical traces, optical connectors, software (stored and executing in hardware) and/or the like.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An optical network, comprising:
   a first node including:
      a first transceiver configured to transmit a first optical signal;
      a first reconfigurable optical add/drop multiplexer (ROADM) operatively coupled to the first transceiver;
      a second ROADM operatively coupled to the first transceiver; and
      a first reconfigurable optical switch disposed between the first transceiver and the first ROADM or the second ROADM;
   a second node including:
      a second transceiver configured to transmit a second optical signal;
      a third ROADM operatively coupled to the second transceiver and configured to receive the first optical signal from the first node;
      a fourth ROADM operatively coupled to the second transceiver; and
      a second reconfigurable optical switch disposed between the second transceiver and the third ROADM or the fourth ROADM; and a third node including:
   a third transceiver configured to transmit a third optical signal;
   a fifth ROADM operatively coupled to the third transceiver and configured to receive the first optical signal from the first node;
   a sixth ROADM operatively coupled to the third transceiver and configured to receive the second optical signal from the second node; and
   a third reconfigurable optical switch disposed between the third transceiver and the fifth ROADM or the sixth ROADM,
the first transceiver is configured to transmit a first portion of the first optical signal to the second node via a first optical channel and transmit a second portion of the first optical signal to the second node via a second optical channel, the first optical signal comprising a first spectral component at a first wavelength and a second spectral component at a second wavelength, and
a first switch in the second reconfigurable optical switch is configured to open to receive the first portion of the first optical signal via the first optical channel and a second switch in the second reconfigurable optical switch is configured to close to block the second portion of the first optical signal.

2. The optical network of claim 1, wherein:
the first transceiver is configured to transmit the first optical signal to the third node via the second optical channel,
the second ROADM in the first node is configured to transmit the second spectral component at the second wavelength and block the first spectral component at the first wavelength,
the second transceiver is configured to transmit the second optical signal to the third node via a third optical channel, the second optical signal comprising a third spectral component at a third wavelength and a fourth spectral component at the first wavelength,
the fourth ROADM in the second node is configured to transmit the third spectral component at the third wavelength and block the fourth spectral component at the first wavelength, and
a first switch and a second switch in the third reconfigurable optical switch is configured to open to receive the second spectral component from the first node and the third spectral component from the second node.

3. The optical network of claim 1, wherein at least one of the first reconfigurable optical switch, the second reconfigurable optical switch, or the third reconfigurable optical switch includes a variable optical attenuator (VOA).

4. The optical network of claim 1, wherein at least one of the first reconfigurable optical switch, the second reconfigurable optical switch, or the third reconfigurable optical switch includes a 1×1 opto-mechanical switch.

5. The optical network of claim 1, wherein:
the first transceiver is configured to transmit the first optical signal at a first the second wavelength to the third node,
the second transceiver is configured to transmit the second optical signal at a second third wavelength to the third node, and
the third node further includes a fourth transceiver, the third transceiver configured to receive the first optical signal from the first transceiver, and the fourth transceiver configured to receive the second optical signal from the second transceiver.

6. The optical network of claim 1,
the first transceiver is configured to transmit the first optical signal at a first the second wavelength to the third node,
the second transceiver is configured to transmit the second optical signal at a second third wavelength to the third node, and
the third node further includes:
   a fourth transceiver; and
   a splitter, a first switch of the third reconfigurable optical switch configured to transmit the first optical signal to the splitter, a second switch of the third reconfigurable optical switch configured to transmit the second optical signal to the splitter, the splitter configured to direct the first optical signal to the third transceiver and direct the second optical signal to the fourth transceiver.

7. The optical network of claim 1, wherein:
the first transceiver is configured to transmit the first optical signal at the second wavelength to the third node,
the second transceiver is configured to transmit the second optical signal at a third wavelength to the third node,
the fifth ROADM in the third node is configured to pass the first optical signal at the second wavelength and block optical signals at other wavelengths,
the sixth ROADM in the third node is configured to pass the second optical signal at the third wavelength and block optical signals at other wavelength, and
the third node further includes a fourth transceiver, the third transceiver configured to receive the first optical signal from the first transceiver, and the fourth transceiver configured to receive the second optical signal from the second transceiver.

8. An optical network, comprising:
a first node comprising:
   a first transceiver to transmit a first optical signal at a first wavelength;
   a second transceiver to transmit a second optical signal at a second wavelength;
   a first reconfigurable optical add/drop multiplexer (ROADM) operatively coupled to the first transceiver and the second transceiver;
   a second ROADM operatively coupled to the first transceiver and the second transceiver; and
   a first reconfigurable optical switch disposed between the first transceiver and the first ROADM or the second ROADM;
a second node comprising:
   a third transceiver configured to transmit a third optical signal at a third wavelength;
   a fourth transceiver configured to transmit a fourth optical signal at the first wavelength;
   a third ROADM operatively coupled to the third transceiver and the fourth transceiver;
   a fourth ROADM operatively coupled to the third transceiver and the fourth transceiver; and
   a second reconfigurable optical switch disposed between the third transceiver and the third ROADM or the fourth ROADM; and
a third node comprising:
   a fifth transceiver;
   a sixth transceiver
   a fifth ROADM operatively coupled to the fifth transceiver and the sixth transceiver;
   a sixth ROADM operatively coupled to the fifth transceiver and the sixth transceiver; and a third reconfigurable optical switch disposed between the fifth transceiver and the fifth ROADM or the sixth ROADM, the optical network is configured to switch between a broadcast mode and a path protection mode, in the broadcast mode:
the second ROADM in the first node is configured to transmit the second optical signal at the second wavelength and block the first optical signal at the first wavelength,
the fourth ROADM in the second node is configured to transmit the third optical signal at the third wavelength and block the fourth optical signal at the first wavelength,
the fifth ROADM in the third node is configured to receive the second optical from the first node, and
the six ROADM in the third node is configured to receive the third optical signal from the second node, in the path protection mode:
the first ROADM in the first node is configured to transmit the first optical signal and the second optical signal to the third ROADM in the second node via a first optical path,
the second ROADM in the first node is configured to transmit the first optical signal and the second optical to the fourth ROADM in the second node via a second optical path, the second optical path further including the fifth ROADM and the sixth ROADM in the third node.

9. The optical network of claim 8, wherein at least one of first reconfigurable optical switch, the second reconfigurable optical switch, or the third reconfigurable optical switch includes a variable optical attenuator (VOA).

10. The optical network of claim 8, wherein at least one of the first reconfigurable optical switch, the second reconfigurable optical switch, or the third reconfigurable optical switch includes a 1×1 opto-mechanical switch.

11. The optical network of claim 8, wherein, in the path protection mode:
a first switch in the second reconfigurable optical switch is configured to open and a second switch in the second reconfigurable optical switch is configured to close so as to cause the second node to receive the first optical signal and the second optical signal from the first optical path.

12. The optical network of claim 8, wherein, in the path protection mode:
the first ROADM in the first node is configured to block optical signals at wavelengths other than the first wavelength,
the second ROADM in the first node is configured to block the first optical signal at the first wavelength,
the third ROADM in the second node is configured to transmit the fourth optical signal at the first wavelength to the first ROADM in the first node,
the fourth ROADM in the second node is configured to transmit the third optical signal at the third wavelength to the sixth ROADM in the third node and block the fourth optical signal at the first wavelength,
the fifth ROADM in the third node is configured to receive the second optical from the first node, and
the six ROADM in the third node is configured to receive the third optical signal from the second node.

13. An optical network, comprising:
a first node comprising:
a first transceiver to transmit a first optical signal at a first wavelength;
a second transceiver to transmit a second optical signal at a second wavelength;
a first reconfigurable optical add/drop multiplexer (ROADM) operatively coupled to the first transceiver and the second transceiver;
a first switch disposed between the first ROADM and the first transceiver;
a second ROADM operatively coupled to the first transceiver and the second transceiver;
a second switch disposed between the second ROADM and the first transceiver; and
a first combiner disposed between the first reconfigurable optical switch and the first transceiver or the second transceiver;

a second node comprising:
a third transceiver configured to transmit a third optical signal at a third wavelength;
a fourth transceiver configured to transmit a fourth optical signal at the first wavelength;
a third ROADM operatively coupled to the third transceiver and the fourth transceiver;
a third switch disposed between the third ROADM and the third transceiver;
a fourth ROADM operatively coupled to the third transceiver and the fourth transceiver;
a fourth switch disposed between the fourth ROADM and the third transceiver; and
a second combiner disposed between the second reconfigurable optical switch and the third transceiver or the fourth transceiver; and a third node comprising:
a fifth transceiver;
a sixth transceiver
a fifth ROADM operatively coupled to the fifth transceiver and the sixth transceiver;
a fifth switch disposed between the fifth ROADM and the fifth transceiver;
a sixth ROADM operatively coupled to the fifth transceiver and the sixth transceiver;
a sixth switch disposed between the sixth ROADM and the fifth transceiver; and
a third combiner disposed between the third reconfigurable optical switch and the fifth transceiver or the sixth transceiver.

14. The optical network of claim 13,
the first transceiver is configured to transmit the first optical signal at a first wavelength to the third node,
the second transceiver is configured to transmit the second optical signal at a second wavelength to the third node, and
the third node further includes:
a fourth transceiver; and
a splitter, the fifth switch configured to transmit the first optical signal to the splitter, the sixth switch configured to transmit the second optical signal to the splitter, the splitter configured to direct the first optical signal to the third transceiver and direct the second optical signal to the fourth transceiver.

15. The optical network of claim 13, wherein:
the optical network switching between a broadcast mode and a path protection mode, in the broadcast mode:
the second ROADM in the first node is configured to transmit the second optical signal at the second wavelength and block the first optical signal at the first wavelength, the fourth ROADM in the second node is configured to transmit the third optical signal at the third wavelength and block the fourth optical signal at the first wavelength, the fifth ROADM in the third node is configured to receive the second optical from the first node, and the six ROADM in the third node is configured to receive the third optical signal from the second node, in the path protection mode:

the first ROADM in the first node is configured to transmit the first optical signal and the second optical signal to the third ROADM in the second node via a first optical path, the second ROADM in the first node is configured to transmit the first optical signal and the second optical to the fourth ROADM in the second node via a second optical path, the second optical path further including the fifth ROADM and the sixth ROADM in the third node.

\* \* \* \* \*